Patented Sept. 14, 1948

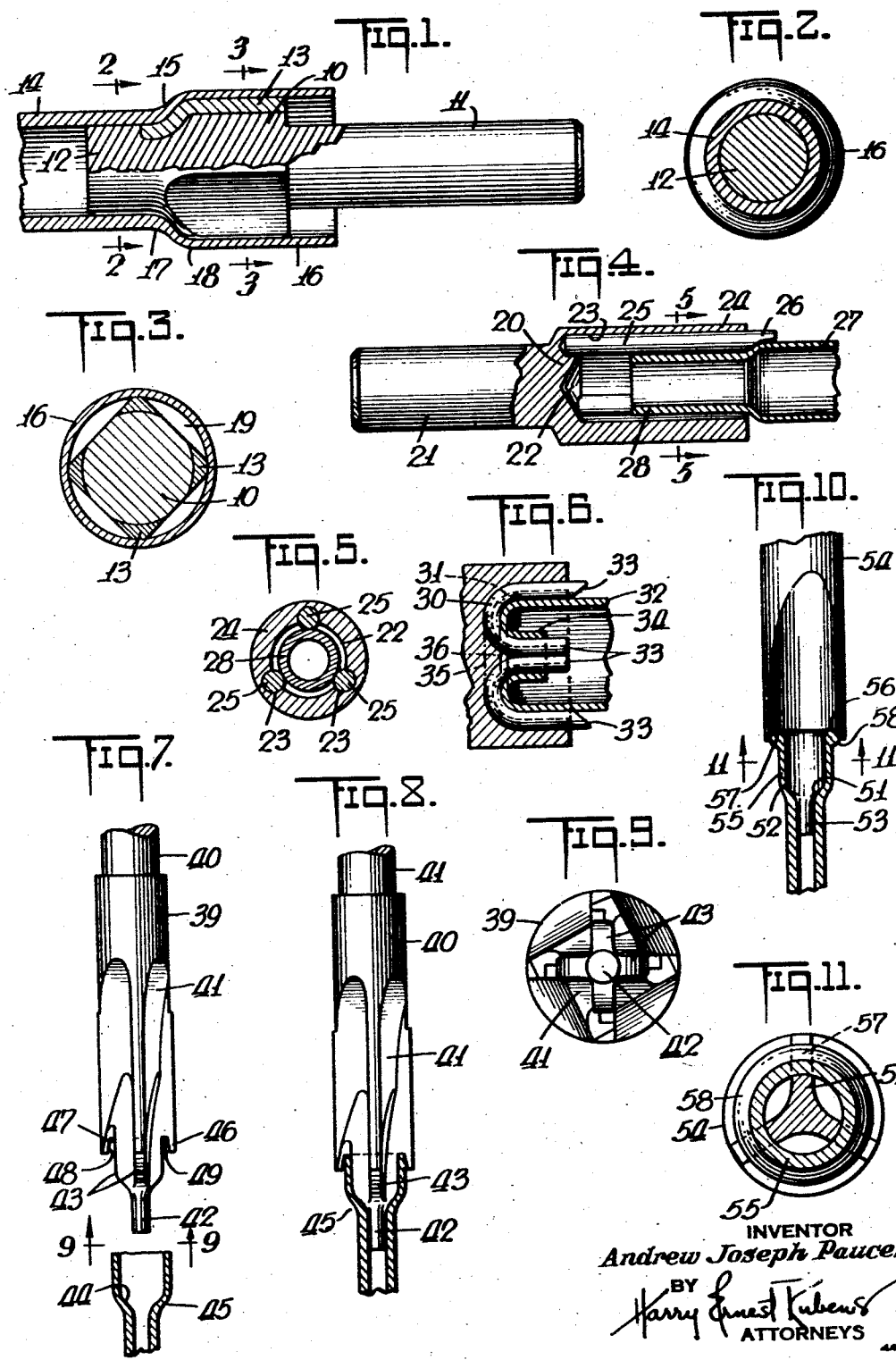

2,449,247

UNITED STATES PATENT OFFICE 2,449,247

METHOD FOR FORMING TUBULAR STRUCTURES

Andrew Joseph Paucek, Flushing, N. Y., assignor to Burndy Engineering Company, Inc., a corporation of New York Application March 25, 1944, Serial No. 528,137

1 Claim. (Cl. 153—81)

My invention relates to a method and tool for forming a tubular structure wherein a tube of material may have one end thereof formed into a predetermined shape.

Hitherto such forming operations have been accomplished by expensive and labor-consuming methods with uncertain results.

The principal object of my invention is to provide a method and a novel tool to be used in conjunction therewith which will produce a reducing, neck forming, closing, enlarging, wall thickening, wall thinning or other shaping operation upon a piece of tubular stock, in a simple operation, at low cost, in a relatively short period of time, and utilizing existing apparatus.

Other objects are to provide a tool for accomplishing the foregoing that may be continuously used despite the wearing action and the formation of high temperatures and pressures; to provide a tool which is capable of generating sufficiently high temperatures in its operation to produce a plastic condition in the work at the point where a change in form is desired; to provide a tool capable of forming the work to predetermined dimensions and within acceptable tolerances; and to provide a tool for forming tubular stock wherein the thickness of the formed wall may be controlled thereby.

I accomplish these and other objects and obtain my new results as will be apparent from the device described in the following specification, particularly pointed out in the claim, and illustrated in the accompanying drawing, in which:

Fig. 1 is a semi-sectional side view of one form of my tool used for enlarging the ends of tubes.

Fig. 2 is a sectional view through plane 2—2 of Fig. 1.

Fig. 3 is a sectional view taken through the plane 3—3 of Fig. 1.

Fig. 4 is a semi-sectional side view of another form of my tool used for reducing the ends of tubes.

Fig. 5 is a sectional view thereof, taken through 5—5 of Fig. 4.

Fig. 6 is a sectional view of a modified set of pressure pins for reversing the tube end inwardly.

Fig. 7 is an exploded view of a modified form of tool for enlarging the ends of tubes, and trimming the ends thereof.

Fig. 8 is a similar view with tool inserted into the tube.

Fig. 9 is an end view of the tool, taken from 9—9 of Fig. 7.

Fig. 10 is a side view of a tool, for enlarging the ends of tubes, and forming a bead about the formed end.

Fig. 11 is a sectional view taken in the plane of 11—11 in Fig. 10.

Referring more particularly to the drawing, and especially to the tool illustrated in Figs. 1 to 3, reference numeral 10 designates an enlarging tool body, having an extending shank portion 11 for insertion into the gripping socket of a screw machine, drill press or other type of machine wherein the tool or work may be spun, relative to each other, in a manner known to the art, and therefore not shown.

At the other end of the tool 10, a guide 12 is formed having a diameter approximately equal to the inside diameter of a tube which it is desired to have enlarged. Between the guide 12, and the body 10, the tube forming structure is shown. This consists of a longitudinally positioned metal insert 13, having an outer shape conforming to the inside shape of the junction of the tube enlargement. In the modification shown in Figs. 1 to 3, the tool body 10 is of square stock, which may be of cold rolled steel. The four longitudinally formed corners have been removed and replaced with a hard material capable of resisting abrasion and wear, and of operating at high temperatures without damage thereto. Such a material is Stellite. These metal inserts 13 may be welded to the tool body 10, or otherwise suitably secured thereto, and partially extend into the guide 12.

As is evident from Fig. 3, the four hardened metal inserts come in contact with the inside wall of the tube 14 at substantially minimum lines of contact and by rotating the tube and tool relative to each other, and simultaneously applying pressure to force the two together, the wall 15 at the point where the metal inserts come in contact therewith is deformed to the initial shape of the tool until the deformed metal work hardens sufficiently to prevent further deformation of the metal and thereafter applying additional pressure causing the work hardened metal to be heated by friction to a point where the work hardened metal of the tube becomes annealed or plastic and expands under the pressure to further deform the annealed work hardened section to permit the tool to advance, and work harden the metal of the stock in advance of the annealed work hardened section, and continuing the process until the stock conforms to the external shape of the tool, to form an enlarged diameter, which corresponds to the diameter of the expanded tube portion 16, and the expansion will continue to take place until the pressure on the two rotating parts is released.

The free spaces 19 are equal to or greater circumferentially than the points of contact between the metal inserts and the tube. It is believed that this ratio facilitates the deformation of the metal by subjecting the points of contact to maximum pressure intensities causing the work hardening of the metal which results in preventing further deformation until the pressures cause the friction to develop sufficient heat to anneal the metal permitting the tool to advance further.

The deformation may be further facilitated by providing curves at points 17 and 18 where the direction of the metal flow is changed and by using the minimum degree of rate of change of curvature at these points.

Additionally, the thickness of the expanded wall may be controlled by increasing the area of contact circumferentially at the point where the change of diameter initially takes place. A smooth surfaced tool circumferentially at this junction will give the maximum wall thickness at 16. Increasing the circumferential free spaces reduces the wall thickness it is believed by causing the tool to work the metal to a greater degree and therefore thinning it.

For reducing the diameters of a tube, the tool illustrated in Figs. 4 and 5 may be used. Here the tool body 20 is provided with shank 21 and a central bore 22, at the opposite end thereof. A plurality of longitudinally and cylindrically formed slots 23 are made in the wall 24 into which slots extremely hard pins 25, are pressure fitted. The length of the pins is approximately equal to the depth of the bore 22, which permits a reduction of the diameter of work tube for an equal length. The slots 23, in wall 24, permit the pins 25 to extend radially into the bore 22 so as to establish contact with the tube. The extending ends 26, of the pins are shaped to provide a gradual change in direction from the maximum diameter 27, of tube, to the reduced diameter 28.

The pins are preferably made of extremely hard, wear resistant material, such as Stellite which may be operated at high heat ranges without injury or softening.

In Fig. 6, I have shown an arrangement of pins which will produce an inwardly projecting tube end. This is accomplished by pressure fitting the U-shaped pins 30 into a socket 31 similar to slots 23 shown in Fig. 4. The tube 32 engages the ends 33 of the pins 30, and follows the U-shaped formation of the pins until the end 34 of the tube 32 assumes the inwardly projecting position as shown in Fig. 6.

If it is desired to close the end of the tube 32 entirely, the pins may be made U-shaped across the entire diameter as indicated by the dot and dash lines 35 of Fig. 6. The tube end will assume the position of the dot-dash lines 36.

Where it is desired to enlarge or reduce tubes of smaller diameters, a tool made entirely of hardened material may be used.

Such a tool is shown in Figs. 7, 8 and 9. Here a tool 39 having a shank 40 has a plurality of longitudinally formed grooves 41 positioned between the guide 42 and the body 40. The grooves or free areas, create on each side thereof, an equivalent structure to the inserts 13 or pins 24, as shown in Fig. 9, with the contacting surfaces 43 like the pins and inserts, presenting areas of minimum contact to the inner surface of the tube 44, so as to permit high speeds with sufficient heat generated to render the work hardened and friction heated area 45 of the tube in substantially a plastic or annealed condition. Here too, the rate of change of the controlled plastic portion from the narrow tube 44 to the enlarged section 45 is accomplished by substantially reversed curves which facilitates the process. In the tool shown the radially overhanging shoulder 46 is provided, having longitudinally extending slots 47, into which the expanded end of the tube 45 will be forced. Edges 48 and 49 will trim the end of the tube as the tube and tool are rotated with reference to each other.

In Fig. 10, a tool is shown for causing a bead to be formed at the edge of the enlarged tube. The tool is made of the same type of wear resistant metal capable of operating at high temperatures caused by the enlarging neck 51 made up of longitudinally positioned teeth 52 extending from the guide pin 53, to the body 54. The enlarging neck 51 under the pressure applied between the tool and the tube as one rotates with respect to the other after work hardening, causes the work hardened section or area in contact with the enlarging neck to become plastic or substantially so, as the heat is generated, until the plastic metal conforms to the enlarging neck while the tool progressively renews the plastic zone to further deform the annealed work hardened section as the pressure is maintained to permit the tool to advance and work harden the metal of the stock in advance of the annealed work hardened section of the zone to form the desired length of the enlarged portion 55. At this point the end 56 of the enlarged portion encounters a curved shoulder 57 in the junction between the teeth and the tube body which rolls the edge 56 to form a bead 58.

In all the foregoing constructions, I have effectively provided a novel tool and a method of working tubular stock to enlarge or reduce or otherwise conform or deform the stock to the shape of the tool until work hardened by rotating the tool and stock with respect to each other while applying sufficient pressure therebetween to cause the heat generated at the work hardened junction point to create a plastic or annealed condition in the work hardened section or zone of the stock in contact therewith. The pressure additionally causes the stock to deform, work harden, anneal and conform to the tool while the work hardened stock is progressively heated, which permits the tool to move progressively on the tubular stock.

The characteristic feature of the tool where it engages the stock is the multiplicity of free areas between points of contact with the stock; the use of minimum areas of contact of wear resistant metal pressure elements; and the control of the free areas to increase or decrease the wall thickness.

It may be noted that the slope of the reducing or enlarging neck is most effective where the angle is small, or less than 45°, thus allowing the metal to change its shape less abruptly and with a minimum resistance to pressure.

I have thus described my invention, but I desire it understood that it is not confined to the particular forms or uses shown and described, the same being merely illustrative, and that the invention may be carrried out in other ways without departing from the spirit of my invention, and, therefore, I claim broadly the right to employ all equivalent instrumentalities coming within the scope of the appended claim, and by means of which, objects of my invention are attained, and new results accomplished, as it is obvious that the particular embodiments here shown and described are only some of the many that can be employed to attain these objects and accomplish these results.

What I claim and desire to secure by Letters Patent, is as follows:

The method of shaping metallic tubular stock with a tool which consists in applying the tool to the stock at room temperature at a plurality of points around the end circumference of the stock with a plurality of free areas in between, the points of contact having a total circumferential length less than the total circumferential length of the free areas and simultaneously applying pressure and rotating the tool and stock relatively to each other sufficiently to deform the stock to the initial shape of the tool and to work harden the deformed metal of the stock sufficiently to prevent further deformation of the metal, thereafter applying additional pressure to create sufficient friction to cause the temperature of the work hardened metal to rise to the annealing point and make the work plastic to enable the tool to further deform the annealed work-hardened section to permit the tool to advance and work harden the metal of the stock in advance of the annealed work hardened section, and continuing the process until the desired longitudinal deformation has been obtained.

ANDREW JOSEPH PAUCEK.

REFERENCES CITED

The following references are of record in the file of this patent:

UNITED STATES PATENTS

| Number | Name | Date |
|---|---|---|
| 172,443 | Ide | Jan. 18, 1876 |
| 1,149,694 | Sonneborn | Aug. 10, 1915 |
| 1,383,839 | Mueller et al. | July 5, 1921 |
| 1,711,075 | Zimmerman | Apr. 30, 1929 |
| 1,761,755 | Smith | June 3, 1930 |
| 1,795,358 | Arndt | Mar. 10, 1931 |
| 1,962,725 | Severson | June 12, 1934 |
| 2,313,474 | Hill | Mar. 9, 1943 |
| 2,325,522 | Lauer et al. | July 27, 1943 |
| 2,346,376 | Heavener | Apr. 11, 1944 |